April 22, 1969     J. M. SLATER     3,439,547
PICKOFF SYSTEM

Filed Feb. 2, 1966

PATH OF SPOT BALL SPIN AXIS DISPLACED FROM PICKOFF SYMMETRY AXIS

INVENTOR.
JOHN M. SLATER
BY Edward Dugas
AGENT

INVENTOR.
JOHN M. SLATER

United States Patent Office 3,439,547
Patented Apr. 22, 1969

3,439,547
PICKOFF SYSTEM
John M. Slater, Fullerton, Calif., assignor to
North American Rockwell Corporation
Filed Feb. 2, 1966, Ser. No. 524,602
Int. Cl. G01c 19/28
U.S. Cl. 74—5.6                                    10 Claims

ABSTRACT OF THE DISCLOSURE

An apparatus for detecting the orientation of the spin axis of a rotating sphere relative to a stationary support member. The apparatus comprises four elongate photodetector elements disposed orthogonically on the support member. As the sphere rotates, spots on the sphere sequentially pass each of the four elements. Appropriate electrical circuitry compares the time a particular spot takes to travel from a first to a second colinear element with the time subsequently taken for the same spot to travel past the second element back to the first. This difference in time is indicative of the orientation of the spin axis along a line perpendicular to the first and second elements.

---

This invention pertains to a pickoff system for detecting the angular orientation of a rotating suspended sphere relative to a supporting member.

In particular the invention has application in the gyroscopic instrument field wherein the rotating sphere is the rotor of a free-rotor gyroscope. The invention also has application to spherical stable elements supported by liquid flotation or in other ways not involving mechanical supporting structures.

In gyros of the electrostatically supported type the rotor is a sphere, solid or hollow, with an electrically conductive surface. A pickoff is provided on the case or supporting member for sensing the angular discrepancy between the rotor spin axis and the case. In one system of making use of the gyro, the case is driven to nullify the angular discrepancy with the aid of a two-axis follow-up servo system. In another type of utilization system the case is fixed to the vehicle frame and the orientation of the case relative to the rotor spin axis, which remains inertially fixed, is measured by a pickoff system of unrestricted angular range.

The first type of system (follow-up) presents no especially onerous pickoff problem provided the sphere is given a preferred axis of rotation as by provision of an internal equatorial rim; see John M. Slater, Inertial Guidance Sensors (Reinhold, 1964), p. 103, for a description of a typical optical type pickoff. However, there are important advantages in not attempting to give the rotor a preferred axis but instead providing a pickoff which operates on the axis wherever it may lie in each individual sphere as determined by mass distribution and geometry of that particular sphere. By not attempting to give the rotor a preferred axis of rotation, there is avoided the difficult production problem of balancing the spinning rotor so that the spin axis coincides accurately with the pickoff null axis. A pickoff of this type based on inductive generation is disclosed in U.S. patent application, Ser. No. 158,055, entitled, "Induction Pickoff Device," by J. C. Boltinghouse et al., filed Dec. 8, 1961, now U.S. Patent No. 3,226,983.

The second type of system presents a serious pickoff problem even though a preferred axis is artificially provided. In principle, the sphere could be provided with any of a variety of patterns such that the orientation of the case (supporting member) relative to the sphere could be sensed. However, the accuracy requirements, which in some cases imply a tolerance of a few seconds of arc in any orientation, make such a provision extremely difficult. In U.S. Patent No. 3,154,953, entitled "Gyroscopic Control Apparatus," by R. D. Ormsby, there is described a wide-range pickoff for free-rotor gyros wherein the spehircal rotor is provided with concentric small circles which are coded to indicate to the pickoff system which circle is being sensed. Arrangements of that type are difficult to manufacture where high resolution is required. The space between concentric circles is essentially a dead zone and for the required resolution the spacing between circles must be reduced to a few microns.

The present invention provides a pickoff primarily intended to solve the first-mentioned problem, that is, to locate the physical spin axis wherever it may happen to be in the sphere. The invention is also applicable in principle to the wide-range situation wherein it is capable of sensing orientation of the spin axis with the aid of a small number of spots or lines.

The pickoff arrangement to be described can also be applied to sensing the orientation of non-spinning spheres provided relative movement is established between the pattern, or indicia, and the pickoff structure.

In all cases the system requires, as a pattern, or indicia, located on the sphere, either a small number (not more than twenty) of geometrically regular spots or lines, or a large number of spots which however do not need to be any specified pattern, thereby making fabrication problems as easy as possible. The length of time one spot remains on one side of a photosensitive pickoff is compared to the length of time the spot remains on the other side of the pickoff, such that the difference in time is a function of the off-centered condition of the spin axis with respect to the case.

It is therefore an object of this invention to provide an improved pickoff system.

It is another object of this invention to provide a pickoff for detecting the orientation of the spin axis of a suspended sphere relative to its supporting member.

A further object of this invention is to provide a pickoff for a spherical rotor operative for any orientation of the rotor with respect to its support.

These and other objects will become more apparent in light of the following description when taken in conjunction with the accompanying drawings in which.

Figure 1:
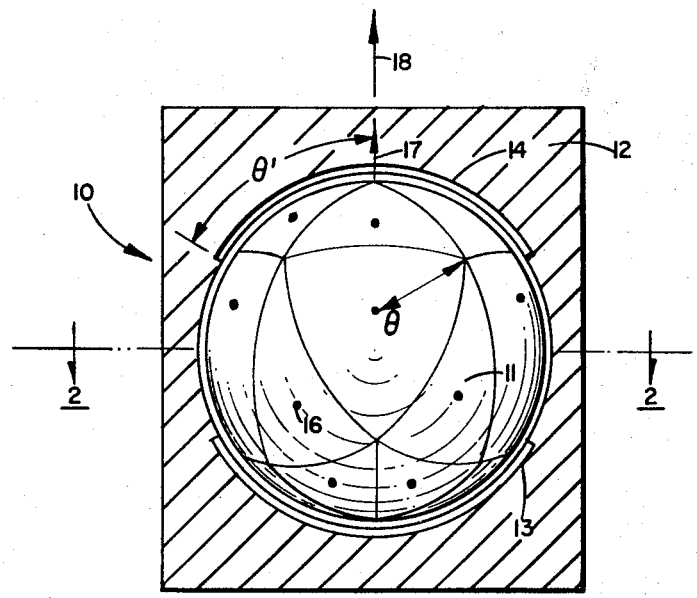
FIG. 1 is a cross-section of a preferred embodiment of the invention.

Referring to FIG. 1, a pickoff system 10 is shown comprised of a first element, or sphere 11, which may be the rotor of a gyroscope, universally supported relative to a second element, or supporting member 12 by means such as an electrostatic support or the like, well-known to those persons skilled in the art.

The sphere 11 is shown provided with twenty spots 16 in icosahedral symmetry, i.e., located at the centers of the twenty sides of an imaginary regular icosahedron tangent to the sphere. (The lines on the sphere are drawn merely as an aid in visualizing the pattern.) A pair of pickoff assemblies 13 and 14 are attached to the supporting member 12 and are formed so as to follow the curvature of the sphere.

The rotor 11 is assumed to spin about a spin axis 17. It is to be understood that the rotor 11 has no preferred axis of spin and that the spin axis 17 for a given rotor may be defined by a line passing anywhere through the surface of the sphere and through the center of mass of the rotor.

The rotor is brought up to speed about the spin axis 17 by means such as an eddy-current induction drive, air currents and other means well known to those persons skilled in the art which form no part of the present invention.

The central or null axis of the pickoff assemblies is identified by reference numeral 18.

Figure 2:
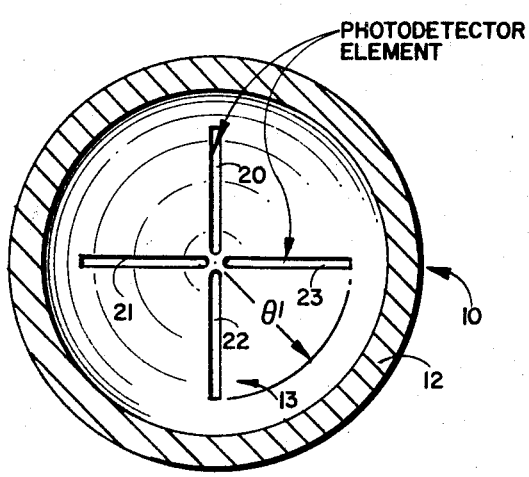
FIG. 2 is a section view of FIG. 1 taken on the line 2—2.

Referring now to FIG. 2, the pickoff assembly 14 is identical in construction and operation to assembly 13 and therefore is omitted for purposes of clarity. Each pickoff assembly is comprised of four narrow strips, 20, 21, 22 nad 23 of photodetector material, for example, cadmium sulfide which are arranged 90 degrees apart.

The arc angle $\theta$ between spots 16 (referring back to FIG. 1) is such that by making the length of each pickoff arc about 45 degrees, that is, making $\theta'=45$ degrees, it is insured that there will always be at least two spots presented to each pickoff assembly per rotation of the sphere about any spin axis or axis of rotation.

Figure 3:
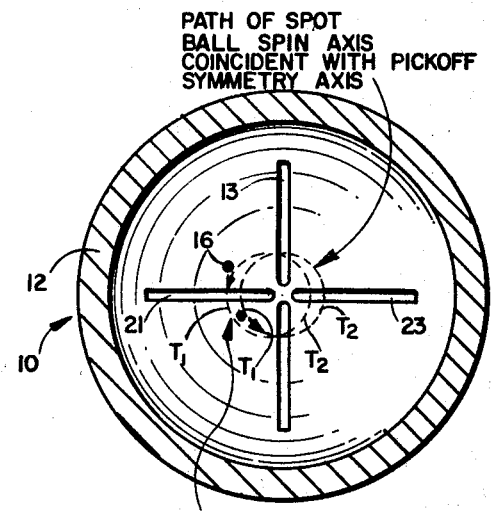
FIG. 3 is a view similar to FIG. 2 illustrating various positions of the spin axis relative to the pickoffs.

Referring now to FIG. 3, consider a sphere orientation where one spot is close to, but not exactly on, the axis of symmetry of the pickoff, and that the sphere's spin axis is on the pickoff axis of symmetry. The output from the pickoff elements will be a series of pulses, at equally spaced intervals $T_1=T_2$. The pulses will be generated each time a spot intercepts one of the strips of photodetector material.

Suppose now that the sphere's spin axis is displaced, along the longitudinal axis of pickoffs 21 and 23, from the pickoff axis of symmetry. Intervals $T_1$ and $T_2$ are now unequal, in other words, frequency modulation occurs, the magnitude and phase of which is a function of the amount and direction of the displacement. Suitable circuits interpret the pickoff outputs and provide an output which may be used to cause a servo system to adjust the case in a sense to restore the null condition.

Conventional frequency comparison techniques can be used to determine the amount and direction of frequency deviation between the photodetector outputs. One such comparison type circuit that may be used to provide the desired output is shown in FIG. 4.

The photodector 21 has its output connected to the charging circuit 41 and to the discharging circuit 43. The photodetector 23 has its output connected to the charging circuit 44 and to the discharging circuit 42. The output of the charging circuit 41 and the discharging circuit 42 is connected to the condenser 45. The output of the discharging circuit 43 and the charging circuit 44 is connected to the condenser 46. The comparison circuit 47 is connected to the condensers 45 and 46 and provides an output indicative of the charge difference on condensers 45 and 46. Such difference may be in frequency and phase.

Figure 4:
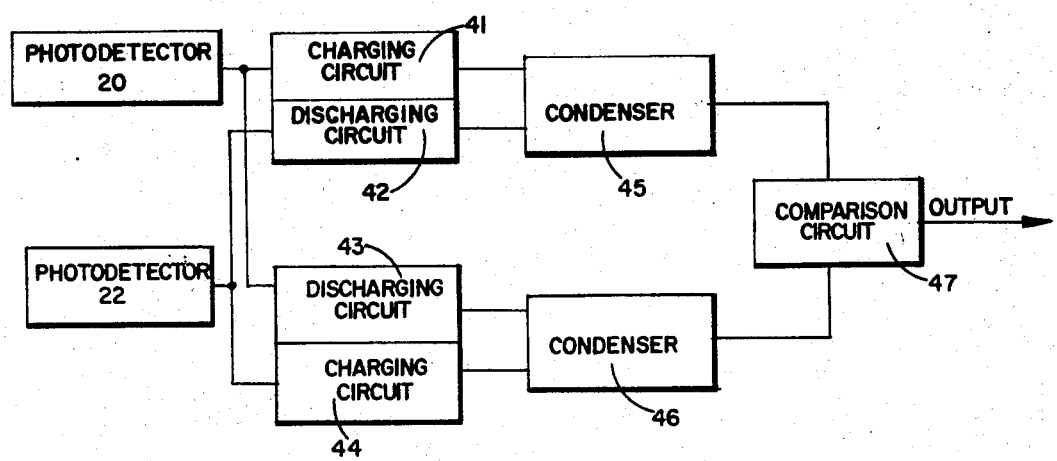
FIG. 4 is a circuit that may be used with the invention.
Figure 5:
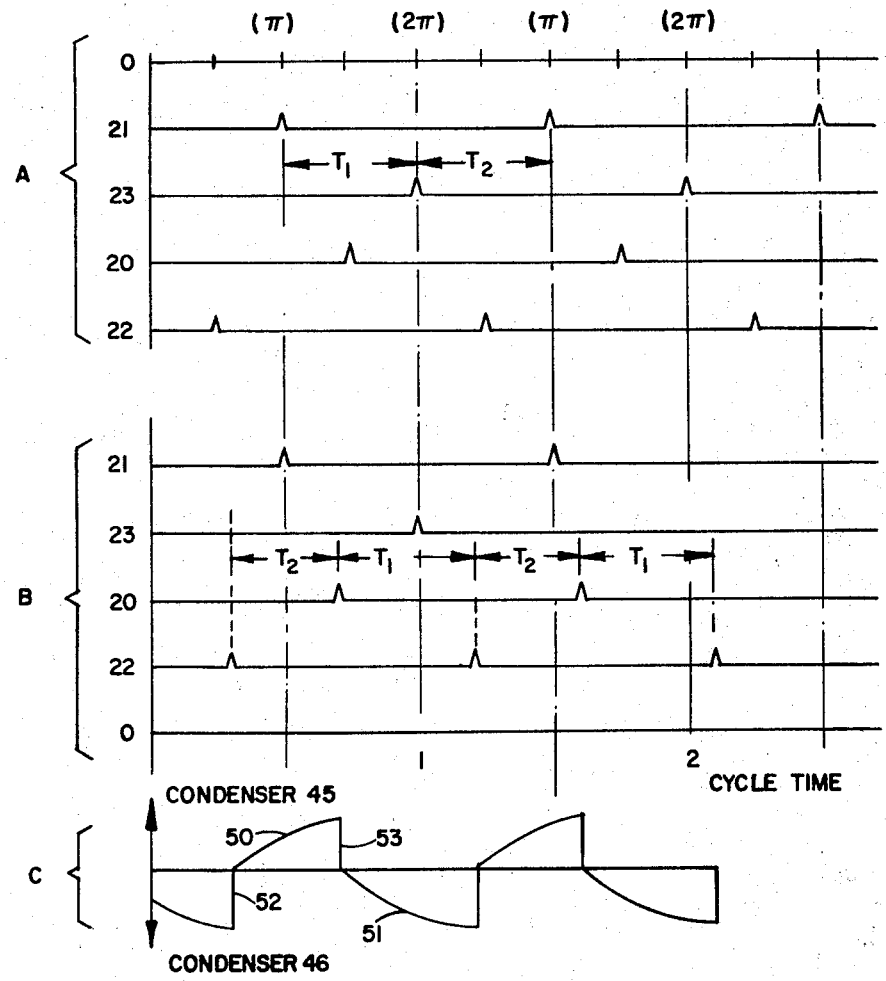
FIG. 5 illustrates various waveforms present in the circuit of FIG. 4.

Referring now to FIG. 5 in conjunction with FIGS. 3 and 4, the waveforms in group A depict the outputs of photodetectors 20, 21, 22 and 23 when the sphere's spin axis 17 is coincident with the pickoff axis 18. The time intervals between pulses are equal, that is, $T_1$ is equal to $T_2$. In the waveforms of group 8 the sphere's spin axis 17 is off-center along the longitudinal axis of pickoffs 21 and 23, therefore the time interval between the pulses from pickoffs 21 and 23 remains the same but the interval of pulses from photodetectors 20 and 22 changes, that is, $T_1$ is not equal to $T_2$. Whether $T_1$ is greater than $T_2$ or $T_2$ greater than $T_1$, will determine the direction in which the rotor spin axis has moved with relation to the pickoff axis. The magnitude of the difference will be an indication of the distance between the two axes. The operation of pickoffs 21 and 23 will be altered in a similar manner when the sphere's spin axis moves along the longitudinal axis of pickoffs 20 and 22. In actual practice the movement of the spin axis is generally a compound movement having components of motion along both pickoff longitudinal axes.

The outputs of capacitor circuits 45 and 46 are shown in FIG. 5 at C. The two outputs are superimposed on the same reference line O to illustrate the variance in the amplitude and width of the charging waves.

The circuit of FIG. 4 is shown responsive to the outputs of photodetectors 20 and 22. The outputs of photodetectors 21 and 23 are connected to an identical circuit and therefore it is not shown for purposes of clarity.

The circuit of FIG. 4 operates as follows: A pulse from photodetector 22 activates the charging circuit 44, charging condenser 46 along the curve 50 (shown in FIG. 5) and also activates the discharging circuit 42, discharging condenser 45 along curve 52. At a time $T_2$ later, photodetector 20 activates the charging circuit 41, charging condenser 45 along the curve 51 and also activates the discharging circuit 43, discharging condenser 46 along curve 53. At a time $T_1$ later, photodetector 22 provides another pulse to complete one cycle or one revolution of the sphere 11 about its spin axis.

The comparison circuit 47 compares the amplitude of the charges on condensers 45 and 46 to determine the deviation of the spin axis from the axis of the pickoff assembly and the phase of the two charging curves to determine the direction of such deviation and provide a signal of the relative position of the two axes.

The pickoff assembly 14 is identical to the assembly 13 as previously mentioned. The circuits connected to pickoffs 20 and 22 are indicative of the circuits that will be connected to the two pairs of pickoffs of which pickoff assembly 14 is comprised. The outputs from pickoff assemblies 13 and 14 are connected in opposition such that if the sphere were to have a lateral motion perpendicular to its spin axis, this motion would not appear as an angular misalignment between the spin axis 17 and the pickoff axis 18.

To take care of more than one spot in the field, the pickoff circuits could be arranged to select the signal corresponding to the first passage of the pickoff and to reject later ones, so that there would be only one pulse per cycle.

Figure 6:
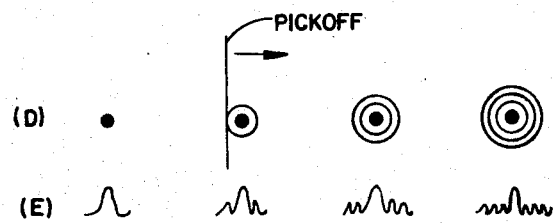
FIG. 6 illustrates possible coding of spots.

Since the phase and amount of the freqency modulation is a function of the orientation of the spin axis relative to the pickoff axis, the possibility is offered of producing a wide-angle pickoff. For this purpose, angle $\theta$ is increased to nearly 90 degrees so that all 20 spots will always be in the field of the pickoffs. Ambiguity could be avoided by coding the spots. Putting rings around the spots as indicated in FIG. 6 at D would code the signal as indicated in FIG. 6 at E if a very narrow pickoff were used. The rings are noncritical in shape and position. Antipodal spots would have the same code so only four pairs would be required. By timing the passages of coded spots, the orientation of the spin axis relative to the case can be computed. This embodiment of the invention requires that the sphere be given a preferred axis of rotation, as by providing an internal equatorial rim.

In the embodiments shown there exists no dead zone, the condition which would exist if a spot happened to be exactly on axis, because there are always at least two spots in the field of the photodetector.

It is also to be noted that the spots do not have to be accurately placed that is exactly 180 degrees apart on the sphere because the system will still seek null just as if they were exactly spaced. This condition does not apply on the wide angle pickoff case.

Figure 7:
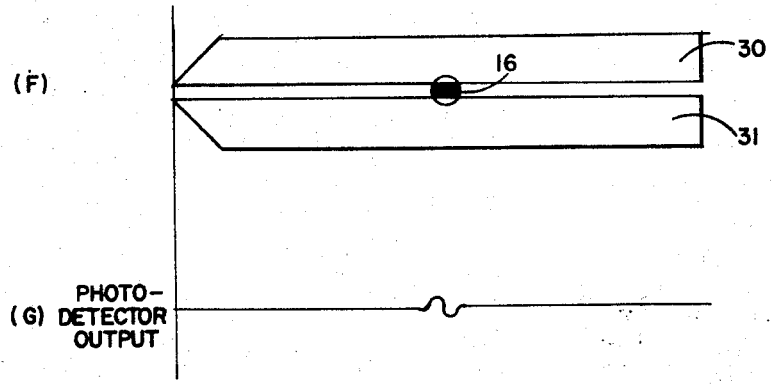
FIG. 7 illustrates one possible configuration of a photodetector that may be used with the invention.

Referring now to FIG. 7 at F, a double photodetector electrode pickoff is shown comprised of electrodes 30 and 31. The outputs from these electrodes are connected in opposition so as to obtain a pair of pulses as indicated in FIG. 7 at G. The center of the pair of pulses marks the effective instant of crossing of the spot 16 between the electrodes.

Figure 8:
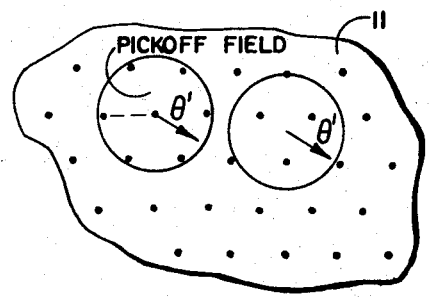
FIG. 8 illustrates another type of spot pattern which may be used with the invention.

Referring to FIG. 8, the pickoff system may be used with a sphere having a large number of irregularly spaced spots. The pickoff 13 having the field of view outlined by the radius $\theta'$ is shown superimposed over an irregularly space spot pattern. The pickoff field of view is made such that at least three but not more than seven spots are viewed at any one time. The reason for this is that it is undesirable to have a condition exist such that only one spot is present within the field of view of the photodetector at any given time. A field of view which can cover two spots will also have at least one position wherein only one spot will appear in the field; therefore, it is necessary to enlarge the field of view so as to cover a minimum of three spots. The field of view which will just cover a minimum of three spots will not cover more than seven spots.

In summary, a pattern comprising a plurality of spots is placed on a rotating sphere which may be the rotor of a gyroscope. In order to determine the axis about which the sphere is spinning a pickoff is provided which intercepts the path of at least one spot twice during each revolution of the sphere. The time between intercepts is compared to provide an indication of the position of the spin axis with respect to the pickoff. The spots do not require accurate placement unless they are to be used for a wide-angle pickoff. For example, if two spots are not exactly 180 degrees apart, the system will seek null just as if they were exactly spaced. There is no dead zone if a spot happens to be exactly on axis because the pickoff may be operated such that there are always at least two spots in the field.

Although specific embodiments of the invention have been shown and described, it is to be understood that many modifications and improvements in the invention will occur to persons skilled in the art. The appended claims are, therefore, intended to cover and embrace any such modifications and improvements within the limit only of the true spirit and scope of the invention.

What I claim is:

1. Apparatus for detecting the orientation of the axis of rotation of a first element relative to a stationary element, said apparatus comprising in combination:
    a plurality of spots on said first element; and
    detector means responsive to passage of said spots, said detector means extending longitudinally on said stationary element and disposed in opposing pairs forming four equal angles, said detector means providing signals indicative of the duration of time one of said spots takes to move through each of said four angles; and
    means for comparing the signals representing the interval taken by said one spot to pass through a first adjacent pair of angles, with the signals representing the interval to pass through the other adjacent pair of angles, the difference in said intervals being indicative of said orientation.

2. Apparatus as defined in claim 1 wherein said first adjacent pair comprises first and second angles, wherein said other adjacent pair comprises third and fourth angles, and wherein said difference is indicative of the orientation of said axis along a path defined by the opposing pair of detector means separating respectively said first from said second, and said third from said fourth angles.

3. Apparatus as defined in claim 1, wherein said first adjacent pair comprises second and third angles, wherein said other adjacent pair comprises fourth and first angles, and wherein said difference is indicative of the orientation of said axis along a path defined by the opposing pair of detector means separating respectively said first from said fourth, and said second from said third angles.

4. Means for detecting the angular orientation of the spin axis of a sphere relative to its supporting member, said means comprising in combination:
    a plurality of spots on said sphere;
    elongate detector means attached to said supporting member for detecting the passage of one of said spots at least twice during each revolution of said sphere, said detection means providing an output indicative of said passage;
    means responsive to said output for determining the difference in time between subsequent passages of said one spot and for providing a signal indicative of said difference, said signal being indicative of the orientation of the spin axis of said sphere with respect to said supporting member.

5. The means of claim 4 wherein said plurality of spots comprises 20 spots disposed in icosahedral symmetry on said sphere.

6. The means of claim 4 wherein said spots are geometrically spaced upon said sphere.

7. The means of claim 4 wherein said elongate detector means comprises:
    first and second photosensitive strips of material, said first strip of material attached to said supporting member defining a first reference axis for displacement, said second strip of material attached to said supporting member perpendicular to said first strip and extending on both sides of said first strip to define a second reference axis for displacement.

8. The means of claim 4 wherein said plurality of spots are coded with encompassing bands.

9. The means of claim 4 and further comprising:
    a second elongate detector means attached to said case opposite to said first named detector means such that linear displacements of said sphere perpendicular to said spin axis with respect to said support member appear as similar outputs from said detector means such that angular orientation is differentiated from linear displacement.

10. The means of claim 8 wherein said means responsive to said detector means is responsive only to the output of said detector means indicative of the passages of a first coded spot when there is more than one spot passing said detector means.

References Cited

UNITED STATES PATENTS

| 3,071,976 | 1/1963 | Kunz | 74—5.6 |
| 3,270,567 | 9/1966 | Crampton | 74—5.6 |
| 3,301,071 | 1/1967 | Shalloway | 74—5.6 |
| 3,313,161 | 4/1967 | Nordsieck | 74—5.6 |
| 3,323,378 | 6/1967 | Powell | 74—5.6 |

C. J. HUSAR, *Primary Examiner.*